UNITED STATES PATENT OFFICE.

GUSTAF NEWTON KIRSEBOM, OF KJÖBENHAVN, DENMARK.

PROCESS OF RECOVERING COPPER FROM ORES AND ORE PRODUCTS.

1,286,652.      Specification of Letters Patent.      Patented Dec. 3, 1918.

No Drawing.      Application filed December 5, 1917. Serial No. 205,701.

*To all whom it may concern:*

Be it known that I, GUSTAF NEWTON KIRSEBOM, a subject of the King of Norway, residing at Kjöbenhavn, in the Kingdom of Denmark, have invented certain new and useful Improvements in Processes of Recovering Copper from Ores and Ore Products; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a process of recovering copper from ores and ore products. According to this process a charge comprising roasted ore containing copper, unroasted ore rich in copper a carbonaceous reducing agent and a flux is smelted in an electric furnace so as to produce a copper matte, which may be further treated to obtain metallic copper.

The process may be used with special advantage in connection with ores rich in copper but with a comparatively low content of sulfur such as copper glance and chalcopyrite. These ores are then used in a mechanically concentrated condition.

When such ores are to be treated, which occur in quartz veins (for instance in Telemarken, in Norway) a special addition of quartz as a flux to the charge may be dispensed with, the necessary quantity of quartz being introduced with the ore.

The roasted ore constituent of the charge may consist of roasted iron pyrite containing some copper but also any other roasted ore containing copper may be used. The proportions of roasted and unroasted ore and of quartz in the charge is determined by considerations well known from the copper smelting practice and varies in accordance with the composition of the constituents in each case. The content of coke or other carbonaceous reducing agent in the charge need not exceed that which is necessary to effect the reduction of the ferric oxid present to ferrous oxid.

An electric furnace of the resistance type is suitably used to effect the smelting of the charge. By smelting a charge of the composition referred to above a copper matte is obtained which is sufficiently rich in copper to be further treated according to known methods to obtain metallic copper. Thus the reduction of this matte to metallic copper may suitably be effected in a bessemerizing furnace. The raw copper obtained in this manner will usually contain a sufficient quantity of silver, gold or nickel to make its refining by means of the electrolytic process remunerative.

I claim:

The process which consists in smelting a sulfid ore rich in copper with a roasted sulfid ore containing copper in the presence of silica and of a quantity of coke sufficient to effect the reduction of ferric oxid to ferrous oxid the said smelting operation being effected in an electric furnace of the resistance type.

In testimony that I claim the foregoing as my invention, I have signed my name in presence of two subscribing witnesses.

GUSTAF NEWTON KIRSEBOM.

Witnesses:
    ERIK FLURY,
    G. SPARRE ULRICH.

Copies of this patent may be obtained for five cents each, by addressing the "Commissioner of Patents, Washington, D. C."